United States Patent
Heo et al.

(10) Patent No.: US 11,232,306 B2
(45) Date of Patent: Jan. 25, 2022

(54) DISPLAY APPARATUS AND CONTROL METHOD THEREOF

(71) Applicant: Samsung Electronics Co., Ltd., Suwon-si (KR)

(72) Inventors: Hyeseon Heo, Suwon-si (KR); Kyoungjae Park, Suwon-si (KR); Youngchun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 16/687,065

(22) Filed: Nov. 18, 2019

(65) Prior Publication Data

US 2020/0167567 A1 May 28, 2020

(30) Foreign Application Priority Data

Nov. 28, 2018 (KR) .................. 10-2018-0149326

(51) Int. Cl.
*G06K 9/00* (2006.01)
*G06T 7/90* (2017.01)
*H04N 5/232* (2006.01)
*G06F 30/13* (2020.01)
*G06F 30/12* (2020.01)
(Continued)

(52) U.S. Cl.
CPC ......... *G06K 9/00671* (2013.01); *G06F 30/12* (2020.01); *G06F 30/13* (2020.01); *G06T 7/90* (2017.01); *G06T 11/60* (2013.01); *H04N 5/232933* (2018.08); *G06F 2111/18* (2020.01);
(Continued)

(58) Field of Classification Search
None
See application file for complete search history.

(56) References Cited

U.S. PATENT DOCUMENTS 9,390,560 B2 7/2016 Meier et al.
9,881,024 B1 * 1/2018 Johnson ................ A61B 5/742
(Continued)

FOREIGN PATENT DOCUMENTS

KR 10-2014-0120986 10/2014
KR 10-2014-0145217 12/2014
(Continued)

OTHER PUBLICATIONS

Extended European Search Report dated May 8, 2020 from European Application No. 19211838.8, 7 pages.
(Continued)

*Primary Examiner* — Jwalant Amin
(74) *Attorney, Agent, or Firm* — Staas & Halsye, LLP

(57) ABSTRACT

A display apparatus includes a communication interface, a camera, a display and a processor configured to receive information on a plurality of images including a first object image corresponding to an identical type of an object selected by a user and a second object image included in each of the plurality of images. The processor is configured to identify one from a plurality of images based on information on a third object image identified from an image photographed through the camera and the received second object image, and control the display to display an obtained image based on the identified image, a fourth object image corresponding to an object selected by the user, and the third object image is displayed.

18 Claims, 10 Drawing Sheets

(51) Int. Cl.
  *G06T 11/60* (2006.01)
  *G06F 111/18* (2020.01)
  *G06T 19/00* (2011.01)
(52) U.S. Cl.
  CPC .. *G06T 19/006* (2013.01); *G06T 2207/20104* (2013.01)

(56) References Cited

U.S. PATENT DOCUMENTS

| | | | |
|---|---|---|---|
| 2008/0071559 A1 | 3/2008 | Arrasvuori | |
| 2009/0324103 A1* | 12/2009 | Gelfand | G06F 16/58 382/224 |
| 2014/0003716 A1* | 1/2014 | Fedorovskaya | G06K 9/00677 382/170 |
| 2015/0363943 A1* | 12/2015 | Yalniz | G06T 7/90 345/591 |
| 2016/0275350 A1* | 9/2016 | Raynaud | G06K 9/00671 |
| 2016/0364793 A1* | 12/2016 | Sacco | G06Q 30/0261 |
| 2017/0109929 A1 | 4/2017 | Meier et al. | |
| 2018/0121988 A1* | 5/2018 | Hiranandani | G06K 9/6202 |
| 2018/0136721 A1 | 5/2018 | Alleaume et al. | |
| 2018/0165370 A1* | 6/2018 | Garcia | G06F 16/5866 |
| 2019/0197599 A1* | 6/2019 | Zia | G06Q 30/0643 |
| 2019/0378204 A1* | 12/2019 | Ayush | G06Q 30/0631 |

FOREIGN PATENT DOCUMENTS

| | | |
|---|---|---|
| KR | 10-2016-0033495 | 3/2016 |
| KR | 10-2018-0055697 | 5/2018 |

OTHER PUBLICATIONS

Breen et al., "Interactive occlusion and automatic object placement for augmented reality", Computer Graphics Forum, Wiley-Blackwell Publishing Ltd, GB, vol. 15, No. 3, Aug. 26, 1996 (Aug. 26, 1996), 12 pages.

Tang et al., "AR Interior Designer: Automatic Furniture Arrangement using Spatial and Functional Relationships", 2014 International Conference On Virtual Systems & Multimedia (VSMM), IEEE, Dec. 9, 2014 (Dec. 9, 2014), 8 pages.

Kan at al., "Automatic Furniture 1-15 Arrangement Using Greedy Cost Minimization", 2018 IEEE Conference On Virtual Reality And 3D User Interfaces (VR), IEEE, Mar. 18, 2018 (Mar. 18, 2018), pp. 491-498.

Examination Report dated Apr. 9, 2021 for European Patent Application No. 19211838.8.

* cited by examiner

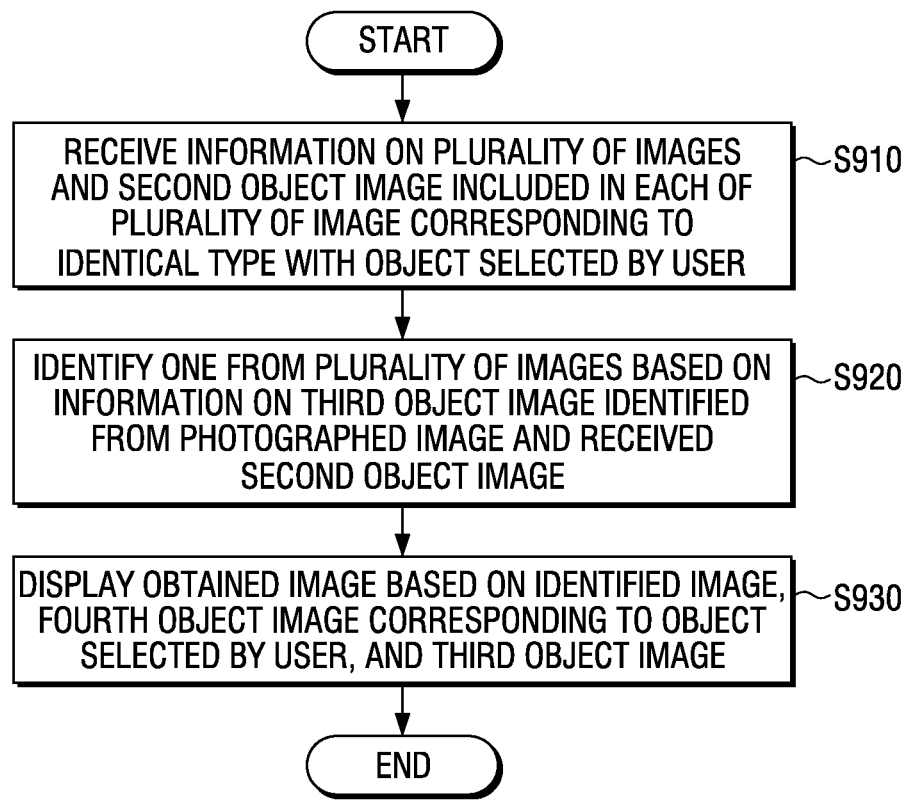

DISPLAY APPARATUS AND CONTROL METHOD THEREOF

CROSS-REFERENCE TO RELATED APPLICATION(S)

This application is based on and claims priority under 35 U.S.C. § 119(a) of a Korean patent application number 10-2018-0149326, filed on Nov. 28, 2018, in the Korean Intellectual Property Office, the disclosure of which is incorporated by reference herein in its entirety.

BACKGROUND

1. Field of the Invention

Aspects of the exemplary embodiments relate to a display apparatus and control method thereof, and more particularly, to a display apparatus which processes an interior image and a control method thereof.

2. Description of Related Art

Recently, with the development of electronic technology, various types of electronic apparatuses have been developed and distributed.

In particular, as interest in indoor interior design recently increases, there have been various attempts to provide a resulting product combining augmented reality (AR) technology with interior design.

However, conventional methods merely provide pre-stored interior images with no consideration for previously arranged interior furniture, home appliances, and accessories. In addition, there is difficulty in providing a virtual interior product that reflects the color of the interior wallpaper and the degree of brightness of interior lighting.

Accordingly, there is a need for providing a virtual interior resulting product by maximally maintaining the furniture, home appliances, and accessories arranged in the interior while adjusting only the positions of the furniture, home appliances and accessories.

In addition, based on arranging new home appliances and furniture, there is a need to provide users with intuitive interior information on suitability with the previous indoor interior.

SUMMARY

The present disclosure has been devised on the basis of the need described above, and an aspect of the exemplary embodiments is to provide a display apparatus that changes an interior image considering an object image included in a photographed image and a control method thereof.

A display apparatus according to one embodiment includes a communication interface, a camera, a display and a processor configured to receive information on a plurality of images including a first object image corresponding to an identical type with an object selected by a user and on a second object image included in each of the plurality of images, and the processor identifies one image from the plurality of images on the basis of information on a third object image identified from an image photographed through the camera and a received second object image, and the processor controls the display to display an obtained image on the basis of the identified image, a fourth object image corresponding to an object selected by the user and the third object image.

The processor may substitute the first object image with the fourth object image in the identified image and may substitute the second object image included in the identified image with the third object image to obtain the image.

The information on the received second object image may include at least one information on the number, size or color of the second object image included in each of the plurality of images, and the processor may identify similarity between each of the plurality of images and the photographed image on the basis of at least one from number, size and color of the third object image identified in the photographed image and may identify an image having the similarity of a threshold value or higher.

The processor may identify the similarity on the basis of an environmental information of each of the plurality of images and the environmental information of the photographed image, and the environmental information may include at least one information from the background color information, brightness information or the spatial size information.

The processor, based on a select command regarding at least one third object image identified from the photographed image being input, may preferentially determine similarity between an object image corresponding to the select command from the third object image and the second object image included in each of the plurality of images to identify the similarity between each of the plurality of images and the photographed image.

The processor may control the display to display obtained images by adding a recommended object image of an identical type with the object selected by the user recommended on the basis of environmental information of the identified image from the plurality of images to a region to which the first object image is removed from the identified image.

The processor may process the environmental information of the photographed image to the obtained image to provide through the display, and the environmental information of the photographed image may include at least one of background color information, brightness information or spatial size information of the photographed image.

The processor may control the display to display a list including at least one of identifying information of the object or an installation type.

The processor may receive information on the plurality of images and on the second object image included in each of the plurality of images from the server, which crawls and stores information on an interior image and on an object included in the interior image.

The processor, based on an object image which is not included in the photographed image from the obtained image being identified, may control the display to display the identified object image to be differentiated from remaining object images, and may provide relevant website information corresponding to the identified object image to the identified object image.

A control method of a display apparatus according to one embodiment of the present disclosure includes receiving information on a plurality of images including a first object image corresponding to an identical type with an object selected by a user and on a second object image included in each of the plurality of images, identifying one from the plurality of images on the basis of information on a third object image identified from the photographed image and a received second object image, and displaying an obtained image on the basis of an identified image, a fourth object image corresponding to an object selected by the user and an image obtained on the basis of a third object image.

The displaying the obtained image may include substituting the first object image from the identified image with the fourth object image corresponding to the object selected by the user, and substituting the second object image included in the identified image with the third objet image to obtain the image.

The information on the received second object image may include at least one information from the number, size or color of the second object image included in each of the plurality of images, and identifying one from the plurality of images may include identifying similarity between each of the plurality of images and the photographed image on the basis of at least one from the number, size or color of the third object image identified from the photographed image, and identifying an image having the similarity of a threshold value or higher.

The identifying one from the plurality of images may include identifying the similarity on the basis of environmental information of each of the plurality of images and the environmental information of the photographed image, and the environmental information includes at least one from the background color information, brightness information or spatial size information.

The identifying one from the plurality of images may include preferentially determining similarity between the object image corresponding to the select command from the third object image and the second object image included in each of the plurality of images based on a select command for one of the third object image selected from the photographed image being input, and identifying similarity between each of the plurality of images and the photographed image.

The obtaining an image by adding a recommended object image of an identical type with the object selected by the user recommended on the basis of environmental information of the identified image from the plurality of images to a region to which the first object image is removed from the identified image may be included.

The displaying the obtained image may include processing environmental information of the photographed image to the obtained image and providing through the display and environmental information of the photographed image may include at least one from the background color information, brightness information or spatial size information of the photographed image.

The displaying a list including at least one from identifying information of the object or installation type may be included.

The receiving may include receiving information on the plurality of images and on the second object image included in each of the plurality of images from the server, which crawls and stores information on an interior image and on an object included in the interior image.

The displaying may include displaying the identified object image to be differentiated from the remaining object images based on an object image, which is not included in the photographed image from the obtained image being identified, and providing relevant website information corresponding to the identified object image to the identified object image.

According to the various embodiments of the present disclosure, a user may be provided with a virtual interior resulting product reflecting furniture, home appliances and accessories arranged indoors and an intuitive perspective interior drawing for arranging new furniture or home appliances

BRIEF DESCRIPTION OF THE DRAWINGS

The above and/or other aspects of the present inventive concept will be more apparent from the descriptions of certain exemplary embodiments of the present inventive concept taken in conjunction with the accompanying drawings, in which:

FIG. 9 is a flow chart provided to explain a control method of a display apparatus according to one embodiment of the present disclosure.

DETAILED DESCRIPTION

Figure 1:
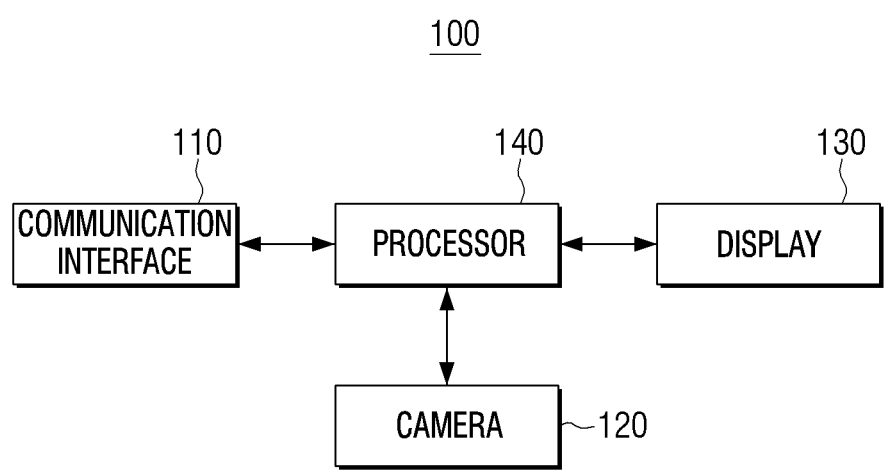
FIG. 1 is a block diagram illustrating the configuration of a display apparatus according to one embodiment of the present disclosure.

Hereinbelow, the present disclosure will be explained in detail with reference to the attached drawings. The terms used in the examples of the present disclosure have been selected from general terms currently widely used in consideration of the functions in the present disclosure, but may be changed based on the intent and precedent of those skilled in the related art, emergence of new technologies, and the like. Also, there may be some terms selected arbitrarily by the applicant in particular cases, and the meanings thereof will be disclosed in detail in the descriptions relevant to the disclosure. Accordingly, terms used in the present disclosure are not simply the designation of the term and must be defined based on the meaning of the term and the context throughout the present disclosure.

In the present disclosure, expressions such as "have", "may have", "including" or "may include" refer to the presence of relevant features (for example, elements such as values, function, operation or components) and does not exclude the presence of additional features.

The expression at least one from A and/or B should be understood as indicating at least one of "A" or "B" or "A" and "B".

Expressions such as "first" or "second" used in the present specification may modify various elements regardless of order and/or importance, and used not to limit the relevant elements but merely to differentiate one element from another element.

Based on a certain element (for example, first element) being indicated as being "coupled (operatively or communicatively) to" another element (for example, second element) or "connected to", it should be understood that a certain element is directly coupled to another element or may be coupled through another element (for example, third element).

Unless clearly specified contextually otherwise, a singular expression includes a plural expression. In the present application, terms such as "include" or "configured" are used herein to designate a presence of characteristics, numbers, steps, operations, elements, components or a combination thereof disclosed in the specification, and should not be understood as precluding in advance the presence of one or more of other features, numbers, stages, operations, elements, components or combinations thereof or additional possibilities.

The term such as "module", "part", and so on in the present disclosure is used to refer to an element that performs at least one function or operation, and may be implemented as hardware or software, or a combination of a hardware and software. Further, except for "module", "part" and the like that need to be realized in a particular hardware, a plurality of "modules" or a plurality of "parts" may be integrated into at least one module and realized in at least one processor (not shown).

In the present specification, the term user designates a user using an electronic apparatus or an apparatus using an electronic apparatus (for example, electronic apparatus with artificial intelligence).

Below, an embodiment of the present disclosure will be described in detail with reference to the attached drawings.

FIG. 1 is a block diagram of a display apparatus according to one embodiment of the present disclosure.

The display apparatus 100 may be realized to apparatuses having display functions such as a TV, a smartphone, a tablet PC, a PMP, a PDA, a notebook PC, a smart watch, a head mounted display (HMD), and a near eye display (NED). The display apparatus 100 may have various forms of display to provide a display function.

However, the various embodiments according to the present disclosure may be realized through electronic apparatuses without display functions. For example, various forms for electronic apparatuses, such as a Blu-ray player, a digital versatile disc (DVD), an output apparatus for streaming contents, and a setup box, which provide contents to a display apparatus, may realize the various embodiments of the present disclosure. As another example, various forms of home appliances such as a speaker, a refrigerator, a washing machine, an air conditioner, an air purifier, and various internet of things may also realize the various embodiments of the present disclosure. For convenience sake, the display apparatus 100 will be explained as a user terminal apparatus equipped with a camera 120.

Referring to FIG. 1, the display apparatus 100 includes a communication interface 110, a camera 120, a display 130 and a processor 140.

The communication interface 110 is a configuration for communicating with an external server.

In particular, the communication interface 110 may receive information on a plurality of images including a first object image corresponding to an identical type with an object selected by the user and a second object image included in each of the plurality of images. According to an embodiment, an object may be at least one from home appliances or furniture. Further, an image may be an image related to indoor/outdoor interior. However, this is only an example and is not limited thereto. For example, an object selected by a user may be various forms of home appliances, furniture, household articles, interior accessories, or the like capable of being disposed indoors/outdoors. Further, images related to indoor/outdoor interior may refer to images including various object forms such as a photographed image, a 2D/3D image, and a virtual reality image taken through cameras or the like. For convenience sake, an object will be explained as home appliances, furniture, or the like and an image will be explained as an interior related image.

The camera 120 may be disposed at least at one position of the front surface or back surface of the display apparatus 100. The display apparatus 100 may use the camera 120 to photograph the front surface or back surface of the display apparatus 100.

According to an embodiment, the camera 120 may be disposed on the back surface of the display apparatus 100, and the display apparatus 100 may obtain through the camera 120 an image in which the surrounding environment of the display apparatus 100 is photographed. For example, the display apparatus 100 may obtain through the camera 120 an image in which the indoor environment is photographed. Here, the image photographed through the camera 120 may include a plurality of object images. For example, the indoor environment image photographed through the camera 120 may include a plurality of object images such as furniture, home appliances, lighting, home decoration products (for example, frames, flowerpots, clocks, mirrors, etc.), and the like furnished indoors. Here, the photographed image is photographed through the camera 120, but this is only an example. The photographed image may refer to a live view image received through the camera 120.

The display 130 may provide various content screens capable of being provided through the display apparatus 100. Here, the content screen may include a variety of content such as an image, a video, text, music or the like, an application execution screen, a graphic user interface (GUI) screen and the like.

The display 130 may be realized as a display of various forms such as a liquid crystal display (LCD), an organic light emitting diodes (OLED) display, and a plasma display panel (PDP). The display 130 may include a driving circuit capable of being realized in forms such as an a-si TFT, a low temperature poly silicon (LTPS) TFT, and an organic TFT (OTFT), a backlight unit, and the like. Meanwhile, the display 130 may be realized as a touch screen coupled with a touch sensor, a flexible display, a 3D display, and the like.

In addition, the display 130 according to one embodiment of the present disclosure may include not only the display panel that outputs images but also a bezel for housing the display panel. Specifically, the bezel according to an embodiment of the present disclosure may include a touch sensor (not shown) to detect user interaction.

In particular, the display 130 may display at least one from a plurality of interior images, photographed images by the camera 120 or obtained images by the processor 140 as described below.

The processor 140 may control the overall operations of the display apparatus 100.

The processor 140 may be realized as a digital signal processor (DSP) processing digital signals, a microprocessor, or a time controller (TCON). However, the processor is not limited thereto, and may include at least one of a central processing unit (CPU), a micro controller unit (MCU), a micro processing unit (MPU), a controller, an application processor (AP), a graphics-processing unit (GPU) or a communication processor (CP), or an ARM processor, or may be defined by the respective terms. Further, the processor 140 may be realized in the form of a system on chip (SoC) having built-in processing algorithm, realized as a large scale integration, or realized as a field programmable gate array (FPGA). The processor 140 may perform various functions by executing computer executable instructions stored in the memory 150.

In particular, the processor 140 may receive information on a plurality of images including a first object image corresponding to an identical type with at least one home appliance or furniture selected by a user through the communication interface 110 and on a second object image included in each of the plurality of interior images. Here, at least one of the home appliance or furniture selected by the user may be at least one home appliance or furniture selected according to a select command, input, or the like by the user. For example, the processor 140 may output a list including a plurality of home appliances, furniture products, or the like.

Further, based on at least one being selected from the home appliances or furniture products included in the list according to user input, information on the plurality of interior images including the first object image corresponding to an identical type with at least one from the selected home appliances or furniture and the second object image included in each of the plurality of interior images may be received.

According to an embodiment, based on the selected home appliance being a TV, a plurality of interior images including a TV may be received. Further, information on the second object image included in each of the plurality of interior images including the TV may be received from the server (not shown).

Here, the server may crawl and store the information on the indoor interior image and the object included in the indoor interior image. Crawling refers to the technology of collecting information distributed and stored in countless web servers and including the information as an index for a search subject.

According to an embodiment, the server obtains a plurality of images through web crawling or web scraping, and identifies indoor interior images from a plurality of images. Further, indexing on a plurality of object images included in the interior images are performed to generate a database (DB). For example, indoor interior images are identified from a plurality of images obtained through web crawling, and information on a sofa, a table, a window, a frame, and the like included in an identified interior image may be stored. Here, a sofa, a table, a window, a frame, and the like are an example of the second object image included the interior image, and not necessarily limited thereto. The second object image may be an identifiable object image (for example, furniture, home appliances, lighting, home decoration products, etc.) included in the interior image. Further, information of the second object image may include at least one of a number, sort (or type), size or color of the identified object image or position on the interior image.

According to another embodiment, based on the selected furniture being a sofa, a plurality of interior images including the sofa may be received. Further, information on the second object image included in each of the plurality of interior images including the sofa may be received from the server.

Meanwhile, the display apparatus 100, in addition to receiving information on interior images including the first object image and the second object image included in the interior images from the server, may self-obtain information. For example, the display apparatus 100 may obtain a plurality of interior images through web crawling, and obtain and store information on the second object image included in the plurality of interior images.

The processor 140 according to one embodiment of the present disclosure may identify one from a plurality of interior images on the basis of information on a third object image identified from the photographed image through the camera 120 and the received second object image.

Here, the third object image refers to the plurality of object images included in the photographed images. For example, the interior image photographed through the camera 120 may include a third object image of various forms such as furniture, home appliances, lighting, home decoration products (for example, a frame, a flowerpot, a clock, a mirror, etc.), and the like furnished indoors.

The processor 140 according to one embodiment of the present disclosure may identify one from the plurality of interior images on the basis of information on an identified third object image from the photographed image and the second object image included in the plurality of interior images.

In particular, similarity between the first interior image and the photographed image may be identified on the basis of information on the second object image included in the first interior image from the plurality of interior images, and on the third object image included in each of the plurality of interior images. Here, information on the second or third object image may include at least one from the number, the size, the color, the type or the position of the object image.

The processor 140, based on the similarity between the first interior image and the photographed image from the plurality of interior images being identified, may identify the similarity between the second interior image and the photographed image from the plurality of interior images through the same method.

According to an embodiment, the processor 140 may identify the similarity between the first interior image and the photographed image on the basis of the number of second object image included in the first interior image and the number of third object image included in the photographed image. For example, the processor 140 may identify the first interior image and the photographed image as similar based on the difference between number of the second object image and the third object image being lower than a predetermined threshold number, or may add a similarity score of the predetermined value.

The processor 140 according to one embodiment may calculate a similarity score for multiple factors from the number, the size, the color, the type or the position of the object image, and identify a final similarity score by aggregating each similarity score.

The processor 140 according to another embodiment, based on a similarity score being calculated for multiple factors from the number, the size, the color, the type, or the position of the object image, may apply different weighted values to the calculated similarity to then aggregate and identify the final similarity score. For example, the processor 140 may apply a greater weighted value to the similarity score calculated for the number of object image for the size of the object image than a calculated similarity image.

In addition, the processor 140 may identify an interior image having a similarity (for example, a similarity score) equal to or greater than the threshold value from the plurality of interior images. According to one embodiment, based on the similarity between the first interior image and the photographed image being equal to or greater than the threshold and the similarity between the second interior image and the photographed image being equal to or greater than the threshold, the processor 140 may only select one image with a relatively high similarity between the first and second interior images, but is not limited thereto. The processor 140 may also select both the first and second interior images.

According to an embodiment, based on there being two home decoration product 'frame' images included in the first interior image and identically two home decoration product 'frame' images included in the photographed image, the processor 140 may determine that the similarity between the first interior image and the photographed image is equal to or greater than the threshold value.

According to another embodiment, based on the size of the furniture 'sofa' image included in the first interior image being similar to the size of the furniture 'sofa' image included in the photographed image, the similarity between the first interior image and the photographed image may be determined as being equal to or greater than the threshold value. According to still another embodiment, a similarity score of 0.5 may be applied based on the number of the frame images included in the first interior image being identical with the number of frame image included in the photographed image and a similarity score of 0.3 may be applied on the basis of the difference between the size of the frame image and the size of the frame image included in the photographed image to identify whether the aggregated respective similarity score of 0.8 is equal to or greater than the predetermined threshold value.

In addition, the processor 140 according to an embodiment of the present disclosure may obtain an image on the basis of a fourth object image corresponding to an identified image, an object (for example, home appliances or furniture, etc.) selected by the user, and a third object image identified from the image. According to an embodiment, the processor 140 may substitute the first object image in the identified interior image with the fourth object image corresponding to at least one home appliance or furniture selected by the user. For example, a 'TV' image included in the first interior image identified as having similarity equal to or greater than the threshold value may be substituted with a 'TV' selected by the user. According to an embodiment, the processor 140 may perform image processing deleting the 'TV' image included in the first interior image and may perform rendering adding the 'TV' selected by the user to the relevant position.

In addition, the processor 140 according to an embodiment may substitute the second object image included in the identified interior image with the third object image and provide the obtained image through the display 130. For example, the 'sofa' image included in the identified first interior image may be substituted with a 'sofa' image included in the photographed image through the camera 120. According to an embodiment, the processor 140 may perform image processing deleting the 'sofa' image included in the first interior image, and may perform rendering adding the 'sofa' image included in the photographed image to the relevant position. Accordingly, the processor 140, using the first interior image received from the server as a background and adding furniture or home appliances selected by the user, may obtain an image added with furniture, home appliances, home decoration products or the like furnished in an indoor environment.

The processor 140 according to an embodiment of the present disclosure may identify similarity on the basis of environmental information of each of the plurality of interior images and environmental information of the photographed image. Here, environmental information may include at least one from a background color information, a brightness information, or a spatial size information.

For example, the processor 140 may identify similarity by comparing the environmental information of the first interior image from the plurality of interior images and the photographed image. According to an embodiment, based on the background color of the first interior image and the indoor background color according to the photographed image being identified as identical or similar, the processor 140 may determine similarity to be equal to or greater than the threshold value. According to another embodiment, based on the brightness of the second interior image from the plurality of interior images and the indoor brightness of the photographed image being identified as identical or similar, the processor 140 may determine similarity to be equal to or greater than the threshold value.

Meanwhile, the processor 140 according to an embodiment of the present disclosure, based on a select command being input from at least one identified third object image from the photographed image, may preferentially determine similarity between an object image corresponding to the select command from the third object image and the second object image included in each of the plurality of images to identify the similarity between each of the plurality of images and the photographed image. According to an embodiment, a user select command may be input for object images such as 'sofas', 'pillars', 'built-in bookcases' and the like in the identified third object image from the photographed image that are relatively difficult to move compared with other home appliances or furniture. Further, the processor 140 may preferentially determine similarity between the object image corresponding to the select command from the third object image and the second object image included in the first interior image. For example, based on a select command being input for a 'built-in bookcase' image from the identified third object image in the photographed image, similarity with the 'built-in bookcase' in the second object image included in the first interior image may be preferentially determined. The processor 140 may then determine similarity between each of the plurality of interior images and the photographed image, which will be described in detail in FIG. 4.

The processor according to an embodiment of the present disclosure may remove the first object image from the identified interior image based on one being identified from a plurality of interior images, and may display the obtained image through the display 130 by adding the recommended object image corresponding to an identical type with at least one home appliance or furniture selected by the user on the basis of the environmental information of the identified interior image to a removed region.

According to an embodiment, based on the home appliance selected by the user being a TV, the TV image is removed from the identified interior image, and a recommended object image corresponding to a TV type may be added to the removed region on the identified interior image. Here, the recommended object image corresponding to the TV type may refer to one from a plurality of products (or, models) belonging to the TV type. For example, based on the home appliance selected by the user being a 55-inch TV, the processor 140 may remove the TV from the first interior image, and may provide a 65-inch TV on the basis of the environmental information of the first interior image as a recommended object image. The processor 140 may add the 65-inch TV image to the region where the TV has been removed from the first interior image. Here, the environmental information of the first interior image may include at least one from a background color information, a brightness information or a spatial size information of the first interior image.

According to another embodiment, based on the furniture selected by the user being a white color table, the processor 140 may remove a table image included in the first interior image, and may remove a black color table on the basis of the background color of the first interior image by adding to the removed region where the table image has been removed.

The processor 140 according to an embodiment of the present disclosure may process the environmental information of the photographed image to the obtained image and may provide the same through the display 130. For example, the processor 140 may substitute the 'sofa' image included in the identified first interior image with a 'sofa' image included in the photographed image with the camera 120. Accordingly, the processor 140, using the first interior image received from the server as a background and adding furniture or home appliances selected by the user, may obtain an image added with furniture, home appliances, home decoration products or the like furnished in an indoor environment. The processor 140 may then perform rendering of the obtained image on the basis of at least one from the background color information, the brightness information or the spatial size information of the photographed image by the camera 120.

Accordingly, an image added with furniture, home appliances, home decoration products or the like furnished in an indoor environment may be obtained by using the photographed image as a background and adding furniture or home appliances selected by the user. Here, the position of furniture, home appliances, home decorations, or the like furnished in the indoor environment may correspond to the position of the second object image included in the first interior image.

The processor 140 according to an embodiment of the present disclosure, based on an object image not included in the photographed image being identified in the obtained image, may display the identified object image to be differentiated from (or, different from) the remaining object images. For example, the 'sofa' image included in the first interior image may be substituted with a 'sofa' image included in the photographed image through a camera. Here, a 'lighting stand' image is included in the first interior image, and it is assumed that there is no 'lighting stand' image in the first interior image. The processor 140 may use the first interior image as the background and thus the 'lighting stand' is not removed and maintained intact. The processor 140 may display the object image maintained intact from the second object image that has not been substituted with a third object image differently from the remaining object images. For example, the 'lighting stand' included in only the first interior image and not in the photographed image may be highlighted unlike the 'sofa' image included in the photographed image. The processor 140 may then provide links to the websites for product purchase corresponding to the identified object image. The processor 140 may provide the websites for the relevant product purchase based on receiving the select command for the identified object image, which will be described in detail in FIG. 8.

Figure 2:
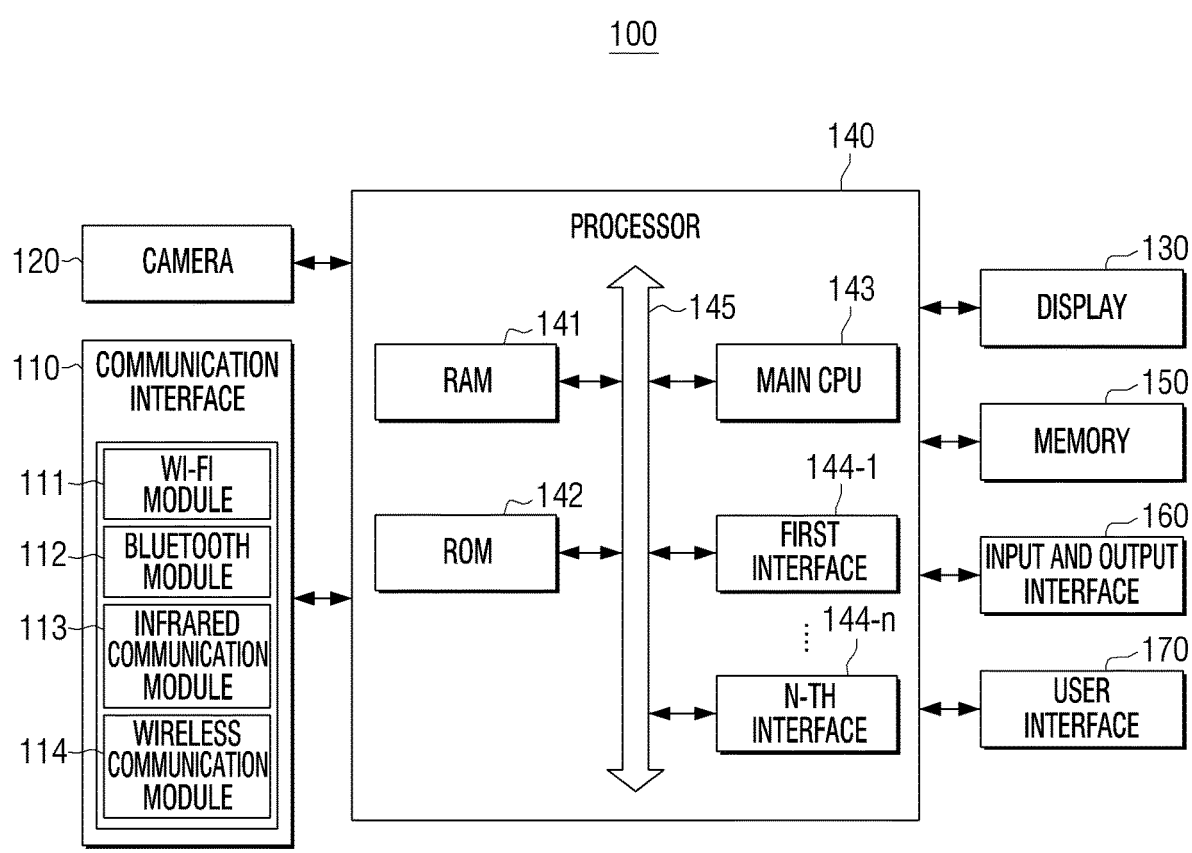
FIG. 2 is a block diagram showing the detailed configuration of a display apparatus illustrated in FIG. 1.

FIG. 2 is a block diagram showing the detailed configuration of a display apparatus illustrated in FIG. 1.

Referring to FIG. 2, the display apparatus 100 may include a communication interface 110, a camera 120, a display 130, a processor 140, a memory 150, a input and output interface 160 and a user interface 170. From the configurations illustrated in FIG. 2, detailed description of the configurations overlapping with the configurations illustrated in FIG. 1 will be omitted.

The communication interface 110 is configured to perform communication with external devices of various types according to a variety of communication methods. The communication interface 110 may include a Wi-Fi module 111, a Bluetooth module 112, an infrared communication module 113, a wireless communication module 114, and the like. Here, each communication module may be realized in the form of at least one hardware chip.

The processor 140 may perform communication with various external devices using the communication interface 110. Here, the external device may include a display apparatus such as a TV, an image processing apparatus such as a set-top box, an external server, a control apparatus such as a remote controller, a sound output apparatus such as a Bluetooth speaker, a lighting apparatus, a smart cleaner, a home appliance such as a smart refrigerator, a server such as an IOT home manager, or the like.

The Wi-Fi module 111 and the Bluetooth module 112 may perform communication by means of a Wi-Fi method and a Bluetooth method. On the basis of using the Wi-Fi module 111 or the Bluetooth module 112, various connection information such as SSID and session key are first transmitted and received, and after communication connecting using the same, may transmit and receive various information.

The infrared communication module 113 may use the infrared present between visible rays and millimeter waves to perform communication according infrared data association (IrDA) technology of transmitting data wirelessly close range.

Other than the aforementioned communication methods, the wireless communication module 114 may include at least one communication chip for performing communication according to various wireless communication specifications such as Zigbee, 3rd generation (3G), 3rd generation partnership project (3GPP), long term evolution (LTE), LTE advanced (LTE-A), 4th generation (4G), 5th generation (5G), or the like.

Other communication interface 130 may include at least one from a wired communication module performing communication using a local area network (LAN) module, an Ethernet module, or a pair cable, a coaxial cable, an optical fiber cable or the like.

According to an embodiment, the communication interface 130 may use a same communication module (for example, a Wi-Fi module) for communicating with an external device such as a remote controller and with an external server.

According to another embodiment, the communication interface 130 may use different communication modules (for example, Wi-Fi module) to communication with an external device such as a remote controller and an external server. For example, the communication interface 130 may use at least one of an Ethernet module or Wi-Fi module to communicate with an external server, and may use a BT module to communicate with an external device such as a remote controller. However, this is merely exemplary, and may use at least one communication module from various communication modules when communicating with a plurality of external devices or external servers.

In particular, the communication interface 110 may receive information on the plurality of interior images and the second object image included in each of the plurality of interior images from the server, which crawls and stores information on the indoor interior image and the object included in the indoor interior image. Meanwhile, this is merely exemplary, and is not limited thereto. For example, the communication interface 110 may receive a plurality of indoor interior images from the external server according to control by the processor 140. The processor 140 may then obtain information on the second object image included in each of the plurality of indoor interior images from the plurality of indoor images received.

According to another embodiment, a method of obtaining an image according to the various embodiments of the present disclosure is performed in a server (not shown), and the display apparatus 100 displays the image received through the communication interface 110 providing the same to the user. For example, the display apparatus 100 may transmit the information on the object selected by the user to the server. The server may then obtain a plurality of images including the first object image corresponding to an identical type with the relevant object on the basis of information received on the object. Further, the server may obtain and store information on the second object image included in each of the plurality of images obtained. Based on the photographed image being received from the display apparatus 100, the server may then identify at least one from the plurality of images on the basis of information on the third object image identified from the photographed image and the second object image. The server may generate an image on the basis of the identified image, the fourth object image corresponding to the object selected by the user and the third object image, and may transmit the generated image to the display apparatus 100. However, this is merely exemplary, and a portion of the aforementioned steps may be performed in the server and the remaining performed at the display apparatus 100.

The display 130 may provide various content screens capable of being provided through the display apparatus 100. Here, the content screen may include various contents such as images, videos, texts, music, etc., an application execution screen including the various contents, a graphic user interface (GUI) screen, and the like.

The display may be realized in various forms of display panels such as a liquid crystal display (LCD), an organic light-emitting diode (OLED), a liquid crystal on silicon (LcoS), a digital light processing (DLP), Micro LED, and quantum dot (QD), but are not limited thereto. Further, the display may be realized in the forms of a flexible display, a transparent display, or the like based on circumstance.

In addition, the display according to an embodiment of the present disclosure may include not only the display panel for outputting images but also the bezel housing the display panel. Particularly, the bezel according to an embodiment of the present disclosure may include a touch sensor (not shown) to detect user interaction.

In particular, the display 130 may display at least one of the plurality of interior images, the image photographed through the camera 120 or the image obtained by the processor 140 as described hereafter.

Meanwhile, the display 130 included in the display apparatus 100 may display various screens generated from a graphics processing unit. The display apparatus 100 may include the display 130 as an element, but may display various screens through the display of an external device by transmitting a signal corresponding to a screen to an external device connected through an interface (not shown).

The processor 140 controls the overall operations of an electronic apparatus (A) using various programs stored in the memory 150.

In particular, the processor 140 includes a RAM 141, a ROM 142, a main CPU 143, a first to $n^{th}$ interfaces 144-1~144-n, and a bus 145.

The RAM 141, the ROM 142, the main CPU 143, the first to $n^{th}$ interfaces 144-1 to 144-n, or the like, may be interconnected through the bus 145.

The ROM 141 stores a set of commands and the like for booting a system. Based on a turn-on command being input and power supplied, the main CPU 143 copies the O/S stored in the memory 150 to the RAM 142 according to the stored command in the ROM 122, and executes the O/S to boot the system. When booting is completed, the main CPU 143 copies various application programs stored in the memory 150 to the RAM 141, and executes the application program copied to the RAM 141 to perform various operations.

The main CPU (143) accesses the memory 150, and performs booting using the O/S stored in the memory 150. Various other operations are then carried out using the various programs, content data, and the like stored in the memory 150.

The first to $n^{th}$ interfaces 144-1~144-n are connected to the various elements described above. One of the interfaces may be a network interface connected to an external device through a network.

Meanwhile, the processor 140 may perform a graphic processing function (view processing function). For example, the processor 140 may generate a screen including various objects such as icons, images, texts, and the like using a calculating unit (not shown) and a rendering unit (not shown). Here, the calculating unit (not shown) may calculate an attribute value such as a coordinate value, a shape, a size, a color, or the like to be displayed by each object according to a layout of the screen on the basis of a received control command. Further, the rendering unit (not shown) may generate a screen of various layouts including an object on the basis of the attribute value calculated by the calculating unit (not shown). Further, the processor 140 may perform various image processing such as decoding, scaling, noise filtering, frame rate conversion, resolution conversion, or the like for the video data.

Meanwhile, the processor 140 may perform processing for an audio data. Particularly, the processor 140 may perform various processing such as decoding or amplifying, noise filtering or the like for the audio data.

The memory 150 stores various data such as an operating system (O/S) software module to operate the display apparatus 100, various multimedia content, and the like.

For example, the memory 150 may be realized as an internal memory such as a ROM (for example, electrically erasable programmable read-only memory (EEPROM)) included in the processor 140, or as a separate memory from the processor 140. In this case, the memory 150 may be realized in the form of a memory embedded in the display apparatus 100 according to data storing purposes or in the form of a detachable memory to the display apparatus 100. For example, the data needed to operate the display apparatus 100 is stored in the memory embedded to the display apparatus, and the data for extended function of the display apparatus 100 may be stored in the memory capable of attaching and detaching to the display apparatus 100. Meanwhile, the memory embedded in the display apparatus 100 may be realized as at least one of a volatile memory (for example: dynamic RAM (DRAM), static RAM (SRAM), or synchronous dynamic RAM (SDRAM), etc.) or a non-volatile memory (for example: one time programmable ROM (OTPROM), programmable ROM (PROM), erasable and programmable ROM (EPROM), electrically erasable and programmable ROM (EEPROM), mask ROM, flash ROM, flash memory (for example: NAND flash or NOR flash, etc.) hard drive, or solid state drive (SSD)), and the memory capable of attaching and detaching to the display apparatus 100 may be realized in the form of a memory card (for example, compact flash (CF), secure digital (SD), micro secure digital (Micro-SD), mini secure digital (Mini-SD), extreme digital (xD), multi-media card (MMC), etc.).

An input and output interface 160 may be one interface among the high-definition multimedia interface (HDMI), mobile high-definition link (MHO, universal serial bus (USB), display port (DP), Thunderbolt, video graphics array (VGA) port, RGB port, d-subminiature (D-SUB), and digital visual interface (DVI).

The input and output interface 160 may input and output at least one of an audio and video signal.

According to an embodiment, the input and output interface 160 may include a port for inputting and outputting only the audio signal and a port for inputting and outputting only the video signal as a separate port, or one port capable of inputting and outputting both the audio signal and video signal.

The user interface 170 may be realized as a device such as a button, a touch pad, a mouse, and a keyboard, or as a touch screen capable of performing the above-mentioned display function and a manipulation input function as well. Here, the button may be various types of buttons such as a mechanical button, a touch pad, a wheel, or the like formed on an arbitrary region such as a front surface part, a side surface part, a back surface part, or the like, of an outer part of the main body of the display apparatus 100.

The display apparatus 100 may be realized as an apparatus without a display, and may transmit a video signal to a separate display apparatus.

Meanwhile, the display apparatus 100 may receive a user voice signal from an external device including a microphone. In this case, the received user audio signal may be a digital voice signal, but may be an analog voice signal according to an embodiment. According to an embodiment, the display apparatus 100 may receive the user audio signal through a wireless communication method such as Bluetooth or Wi-Fi. Here, the external device may be realized as a remote control device or a smartphone.

In order to identify audio of the audio signal received from the external device, the display apparatus 100 may transmit the relevant audio signal to the external server.

The display apparatus 100 according to an embodiment of the present disclosure may transmit the digital voice signal received from an audio recognition server. In this case, the audio recognition server uses speech to text (STT) to covert the digital voice signal to text information. In this case, the audio recognition server may transmit text information to a different server or the display apparatus to perform a search corresponding to the text information, and in some cases, perform a direct search.

Meanwhile, the display apparatus 100 according to another embodiment of the present disclosure may directly apply the speech to text (STT) function to the digital voice signal to convert to text information and may transmit the converted text information to an external server.

A speaker (not shown) may be an element to output not only various audio data processed by the input and output interface 160, but also to output various alarm sounds, audio messages, or the like.

Meanwhile, the display apparatus 100 may further include a microphone (not shown). The microphone is an element for receiving input of user voice or other sounds to convert to audio data.

The microphone (not shown) may receive user voice in an activated state. For example, the microphone may be integrally formed as an integral unit on the upper side or a front surface direction, a side surface direction, or the like. The microphone may include various configurations such as a microphone for collecting user voice in an analog format, an amplifier circuit for amplifying the collected user voice, an A/D conversion circuit for sampling the amplified user voice to convert into a digital signal, a filter circuit for removing a noise element from the converted digital signal, or the like. That is, when user voice in an analog format is received from the microphone included in the display apparatus 100, the microphone may convert user voice to a digital signal to transmit to the processor 140. The processor 140 may then control the display apparatus to perform an operation corresponding to the digital signal. Meanwhile, the above is one embodiment and not limited thereto.

According to another embodiment, the display apparatus 100 may receive user voice from the external device (not shown) including a microphone. For example, the external device may be realized as a remote control device (remote controller) including a microphone, but is not limited thereto. Here, when the remote control device (remote controller) receives the analog voice signal of the user through the microphone, the remote control device (remote controller) may convert the analog voice signal to a digital voice signal. Further, the remote control device (remote controller) may transmit the converted digital voice signal to the digital apparatus 100 using at least one of infrared, Wi-Fi, or Bluetooth communication methods. When the digital voice signal is received from the external device, the display apparatus 100 performs voice recognition on the basis of the received digital voice signal, and may perform a control operation on the basis of the results of voice recognition. However, according to another embodiment, the remote control device (remote controller) performs a voice recognition operation for the digital voice signal, and information corresponding to the results of the voice recognition may be realized in the form of transmitting to the display apparatus 100. Here, information corresponding to the results of voice recognition may be at least one among the results of the voice recognition itself or a control command n to the results of the voice recognition.

Meanwhile, according to still another embodiment, the external device may be realized to a smartphone including a microphone. In this case, the smartphone uses a remote control application to perform installed remote control function to remotely control the display apparatus 100.

When the analog voice signal of the user is received through the microphone, the smartphone may convert the analog voice signal to the digital voice signal. In this case, the smartphone uses the voice recognition application to perform voice recognition of the digital voice signal. Here, the voice recognition application may be the same as or different from the remote control application described above. When recognition of voice recognition for the digital voice signal is performed, the smartphone uses the remote control application based on the voice recognition results to remotely control the display apparatus 100. However, according to another embodiment, the smartphone uses at least one of infrared, Wi-Fi, or Bluetooth communication methods to transmit the converted digital voice signal to the display apparatus 100. In this case, when the digital voice signal is received from an external device, the display apparatus 100 performs voice recognition based on the received digital voice signal, and may perform a control operation based on the voice recognition results.

A remote controller signal receiver (not shown) is configured to receive a remote controller signal transmitted from the remote controller. The remote controller signal receiver may be realized in the form of including a light receiving unit to receive an infrared signal or in the form of receiving remote controller signal by performing communication according to a wireless communication protocol such as a remote controller and a Bluetooth or a Wi-Fi. For example, the remote controller receiver may include a wireless communication chip. Here, the wireless communication chip may refer to a chip performing communication according to various communication specifications such as IEEE, Zigbee, 3rd generation (3G), 3rd generation partnership project (3GPP), long term evolution (LTE), Wi-Fi, Bluetooth, and the like. The display apparatus 100 according to an embodiment may receive user voice input through the microphone included in the remote controller through the remote controller receiver.

Here, the remote controller receiver may perform wireless communication with the remote controller, and may receive user voice, control commands, or the like from the remote controller. For example, the display apparatus 100 may receive user utterance voice input through the microphone included in the remote controller through the remote controller signal receiver, but is not limited thereto. The display apparatus 100 may perform communication with the remote controller by various forms of communication methods through the remote controller receiver, and may receive and transmit the user voice, the control command, data, signals of various forms, or the like to the remote controller, but is not limited thereto. The display apparatus 100 may perform communication with the remote controller by various forms of communication methods through the remote controller receiver, and may receive and transmit user voice, control command, data, signals of various forms, or the like with the remote controller.

Meanwhile, the display apparatus 100 may further include a tuner and a demodulator according to an embodiment.

The tuner (not shown) may tune channels selected by the user or all pre-stored channels from a radio frequency (RF) broadcasting signal received through the antenna to receive RF broadcasting signal.

The demodulator (not shown) receives a digital IF signal (DIF) converted from the tuner, and perform channel decoding, or the like.

Figure 3A:
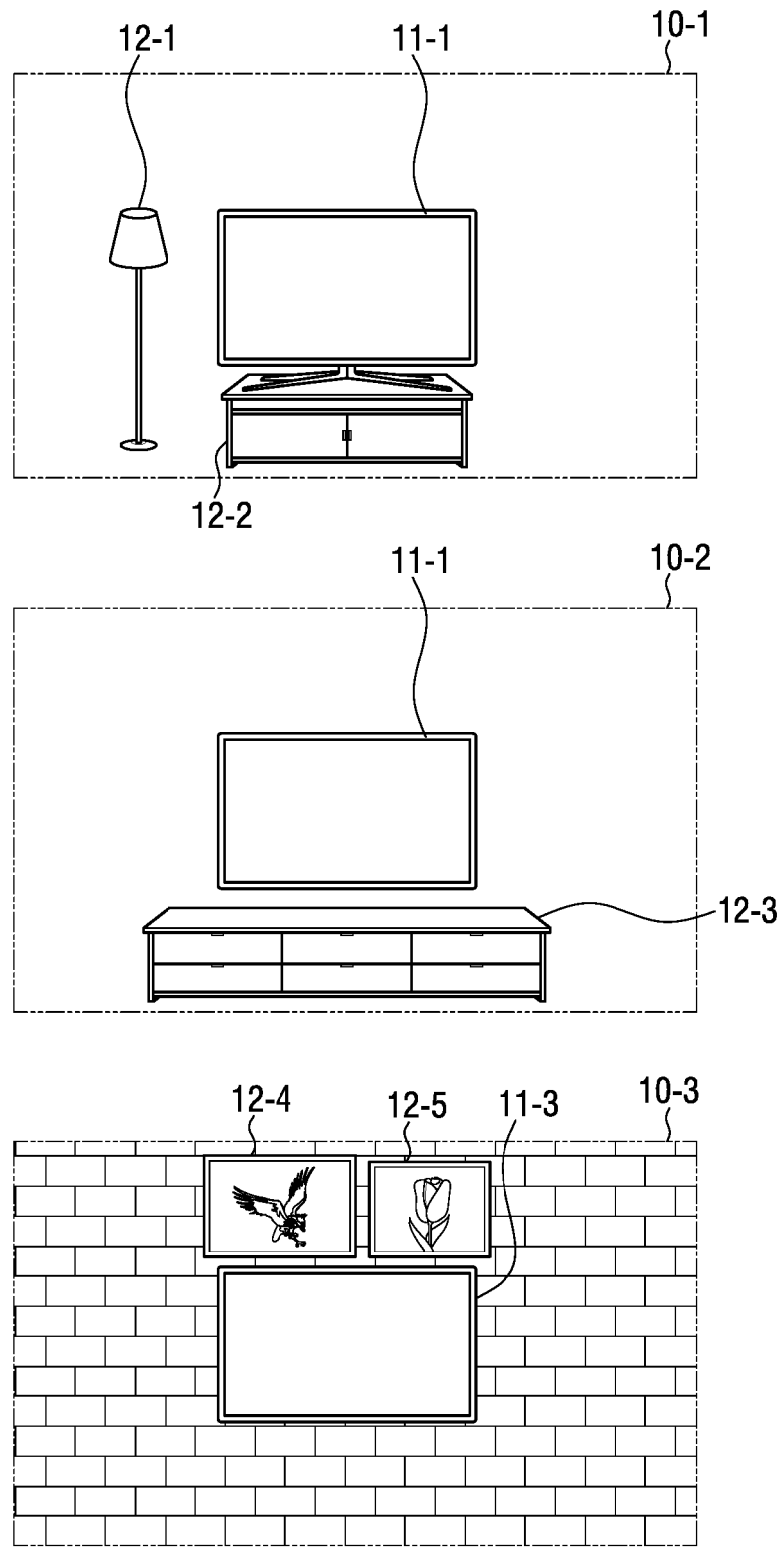
FIGS. 3A and 3B are views provided to explain a plurality of interior images according to one embodiment of the present disclosure.
Figure 3B:
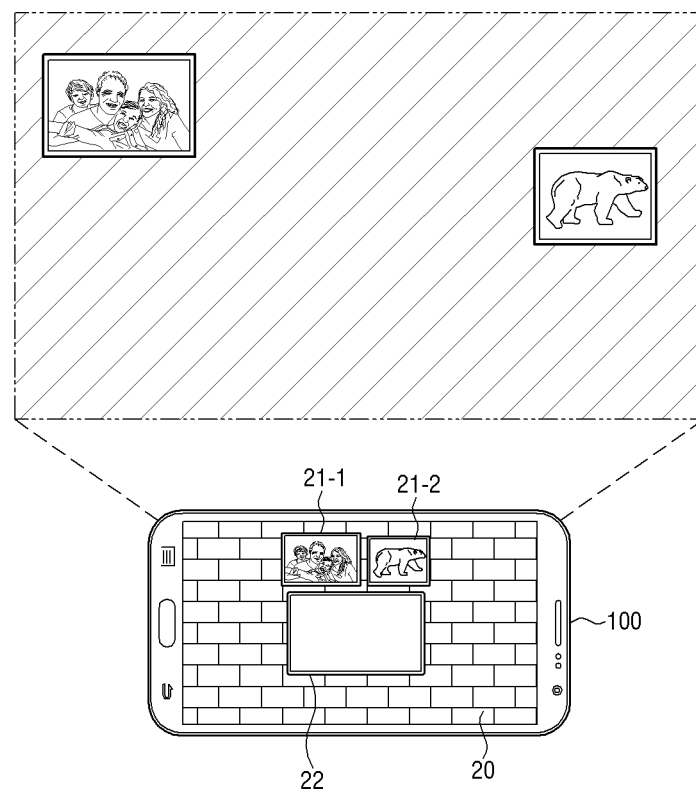

FIGS. 3A and 3B are views provided to explain a plurality of interior images according to one embodiment of the present disclosure.

Referring to FIG. 3A, the display apparatus 100 may receive a plurality of interior images 10-1, 10-2 and 10-3 including the first object image corresponding to an identical type with at least one home appliance or furniture selected by the user. According to an embodiment, based on the home appliance selected by the user being a 55-inch TV of company A, the display apparatus 100 may receive a plurality of interior images 10-1, 10-2, 10-3 including a TV image, that is, identical in type with the 55-inch TV of company A. According to another embodiment, based on the furniture selected by the user being a wardrobe of company B, the display apparatus may receive a plurality of interior images 10-1, 10-2, 10-3 including a wardrobe, that is, identical in type with the wardrobe of company B.

The display apparatus 100 according to an embodiment of the present disclosure may receive information on the second object image included in each of the plurality of interior images 10-1, 10-2 and 10-3. According to an embodiment, information on a lighting stand 12-1 and a table 12-2, that is, the second object image included in the first interior image 10-1 may be received. Here, the first interior image 10-1 includes the first object image 11-1.

In addition, the display apparatus 100 may receive information on a table 12-3, that is, the second object image included in the second interior image 10-2. Further, the display apparatus 100 may receive information on a first frame image 12-4 and a second frame image 12-5, that is, the second object image included in the third interior image 10-3.

Here, information on the second object image may include at least one from the number, sort (or type), size or color of the identified object image or position on the interior image. For example, information on the lighting stand 12-1 from the second object image included in the first interior image 10-1 may include at least one of the sort, color, or size of the lighting stand 12-1, or the position of the first interior image 10-1.

Here, the position of the lighting stand 12-1 on the first interior image 10-1 may refer to an (x, y) coordinate information. According to another embodiment, the position of the lighting stand 12-1 may refer to information on the separated distance, whether the lighting stand 12-1 is placed to the left or to the right, or the like, based on the first object image 11-1 included in the first interior image 10-1.

According to another embodiment, information on the second object image included in the third interior image 10-3 may include number information of the first and second frame images 12-4 and 12-5. Further, the respective first and second frame images 12-4 and 12-5 may refer to information on the separated distance, whether positioned to the left or to the right, or the like, based on the first object image 11-3 on the third interior image 10-3.

Referring to FIG. 3B, the display apparatus 100 may identify the third object image from the photographed image through the camera 120. Here, the first object image may refer to the image corresponding to an object of various sorts positioned in the indoor interior. For example, the photographed image may include the third object image 21-1 and 21-2 corresponding to the plurality of frames located indoors. Meanwhile, according to an embodiment, the display apparatus 100 may identify the third object image corresponding to the object (for example, furniture, home appliances, lighting, home decoration products, etc.) of various forms located indoors.

The display apparatus 100 according to an embodiment of the present disclosure may identify one from the plurality of interior images on the basis of information on the third object image and the received second object image.

The display apparatus 100 according to an embodiment of the present disclosure may identify one interior image based on at least one information from the number, size or color of the second object image included in each of the plurality of interior images 10-1, 10-2 and 10-3 and one from the number, size or color of the third object image identified in the photographed image.

Referring to FIGS. 3A and 3B, the third interior image 10-3 from the plurality of interior images 10-1, 10-2 and 10-3 may identify similarity between the third interior image 10-3 and the photographed image on the basis of the third object image 21-1 and 21-2 identified from the information on the first and second frame images 12-4 and 12-5 and the third object image 21-1 and 21-2 identified in the photographed image.

For example, the display apparatus 100, based on the information on the second object image included in the third interior image 10-3, may obtain information on two first and second frame images 12-4 and 12-5, the respective sizes, colors, positions of each of the first and second frame images 12-4, 12-5. The display apparatus 100 may then obtain information on the respective sizes, colors, positions of the two frames disposed in the indoor environment on the basis of the third object image identified from the photographed image. The display apparatus 100 may then identify similarity between the third interior image 10-3 and the photographed image on the basis of obtained information. Through such method, the display apparatus 100 may identify similarity between the first interior image 10-1 and the photographed image, and identify similarity between the second interior image and the photographed image.

The display apparatus 100 according to an embodiment of the present disclosure may identify similarity by preferentially determining the type and number of the second object image included in the interior image and the type and number of the third object image included in the photographed image. Referring to FIGS. 3A and 3B, the display apparatus 100 may identify (or, select) the third interior image from the plurality of interior images 10-1, 10-2 and 10-3 based on similarity between two first and second frame images 12-4, 12-5 according to information on the second object image included in the third interior image 10-3 and the third object images 21-1, 21-2 included in the photographed image.

The display apparatus 100 may then substitute the first object image from the identified interior image with the fourth object image 22 corresponding to at least one of the home appliances or furniture selected by the user. According to an embodiment, based on the home appliance selected by the user being a 65-inch TV from company A, the display apparatus 100 removes the TV image from the identified third interior image 10-3, and may add a TV image corresponding to the 65-inch TV from company A to the removed region. Further, the display apparatus 100 may substitute the second object image included in the identified interior image with the third object images 21-2 and 21-2. For example, the first and second frame images 12-4 and 12-5 included in the identified third interior image are removed, and the identified third object images (for example, two frame images 21-1 and 21-2) from the photographed image may be added to the removed region. The display apparatus 100 substitutes the first object image 11-3 from the identified interior image with the fourth object image 22 corresponding to at least one home appliance or furniture selected by the user, and substitutes the second object images 12-4 and 12-5 included in the identified interior image with the third object image 21-1 and 21-2 to display the obtained image 20.

Referring to FIG. 3B, the position of the frame included indoors and the position of the frame on the obtained image 20 provided through the display apparatus 100 may be different. The display apparatus 100, using the identified interior image as a background, may add furniture or home appliances selected by the user, and obtain an image added with the furniture, home appliances, home decoration products, or the like included in an indoor environment. According to an embodiment, the position of the furniture, home appliances or home decoration products included in the interior image is maintained intact, and the shape, color or size may be substituted with the shape, color or size of the furniture, home appliances or home decoration products obtained from the photographed image through a camera 110.

Figure 4:
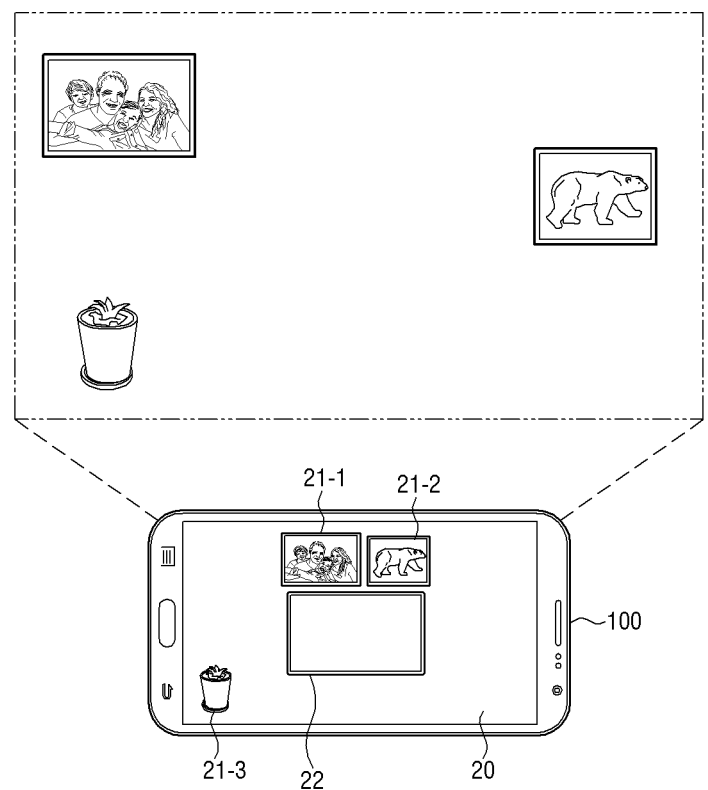
FIG. 4 is a view provided to explain similarity according to one embodiment of the present disclosure.

FIG. 4 is a view provided to explain similarity according to one embodiment of the present disclosure.

The display apparatus 100 according to an embodiment of the present disclosure, based on a select command being input for at least one of the third object images 21-1, 21-2 and 21-3 identified from the photographed image, similarity between the object image 21-3 corresponding to the select command from the third object images and the second object image included in each of the plurality of interior images 10-1, 10-2 and 10-3 is preferentially determined, and similarity between the each of the plurality of interior images 10-1, 10-2 and 10-3 and the photographed image may be determined.

Referring to FIG. 4, the frame images 21-1 and 21-2 and the flowerpot image 21-3 may be identified from the third object images 21-2, 21-2 and 21-3 identified from the photographed image. Here, based on a select command of the user for the flowerpot image 21-3 being input, the display apparatus 100 may preferentially determine similarity between the selected flowerpot image 21-3 and the second object image included in each of the plurality of interior images 10-1, 10-2 and 10-3. For example, the flowerpot disposed indoors corresponding to the flowerpot image 21-3 may be difficult to move by the user or may be an object determined as important to the indoor interior. As a different example, based on a select command of the user for an object image corresponding an object that must be considered such as pillars or built-in bookcases being input, the display apparatus 100 may preferentially determine similarity between the object image (for example, flowerpot image 21-3) corresponding to the select command and the second object image included in the interior image. The second object image included in the interior image may then be substituted with the third object image.

For example, referring to FIG. 4, the display apparatus 100 may substitute the second object image (for example, flowerpot image) included in the identified interior image with the object image (for example, flowerpot image 21-3) identified by the user.

Meanwhile, according an embodiment, based on the object image selected by the user being more than one, the selected plurality of object images is preferentially determined to determine similarity. According to another embodiment, a prioritized order from the plurality of object images selected by the user may be present, and the display apparatus 100 may preferentially consider the highest order in the prioritized order from the selected plurality of object images to determine similarity between the interior image and the photographed image.

Figure 5:
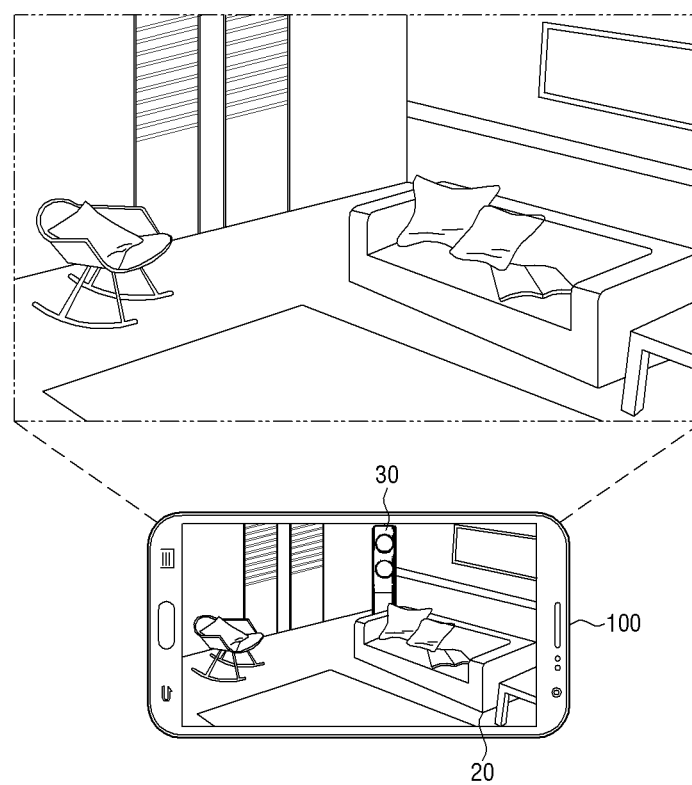
FIG. 5 is a view provided to explain a recommended object image according to one embodiment of the present disclosure.

FIG. 5 is a view provided to explain a recommended object image according to one embodiment of the present disclosure.

The display apparatus 100 according to an embodiment of the present disclosure, based on identifying one from the plurality of interior images, removes the first object image from the identified interior image, adds the recommended object image corresponding to an identical type with at least one home appliance or furniture selected by the user on the basis of environmental information of the identified interior image to the removed region to display the obtained image.

For example, the display apparatus 100, based on the home appliance selected by the user being a 55-inch TV of company A, the TV image is removed from the identified interior image, and the recommended object image corresponding to the TV on the basis of environmental information of the identified interior image may be added to the removed region. According to an embodiment, the recommended object image may be a 65-inch TV of company A.

The display apparatus 100, in addition to adding the fourth object image corresponding to the home appliance selected by the user to the identified interior image, may also provide a recommended object image on the basis of environmental information of the identified interior image.

According to another embodiment, based on the home appliance selected by the user being a black color air conditioner by company A, the display apparatus 100 removes the air conditioner image from the identified interior image and may provide a black color air conditioner image by company A by adding to the removed region.

The display apparatus 100, although not limited thereto, may identify a white color air conditioner by company A according to the environmental information of the interior image in which the air conditioner image is removed as recommended object image 30 and may obtain an image 20 by adding the identified recommended object image 30 to the interior image.

According to still another embodiment, based on the furniture selected by the user being a wine color built-in bookcase of company B, the display apparatus 100 removes the built-in bookcase image from the identified interior image, and may provide a white color built-in bookcase image of company B by adding to the removed region on the basis of environmental information of the identified interior image.

The display apparatus 100 may add the fourth object image corresponding to home appliances or furniture selected by the user to the interior image, and may also add a fourth object image corresponding to a type of the home appliances or furniture selected by the user to the interior image.

Figure 6:
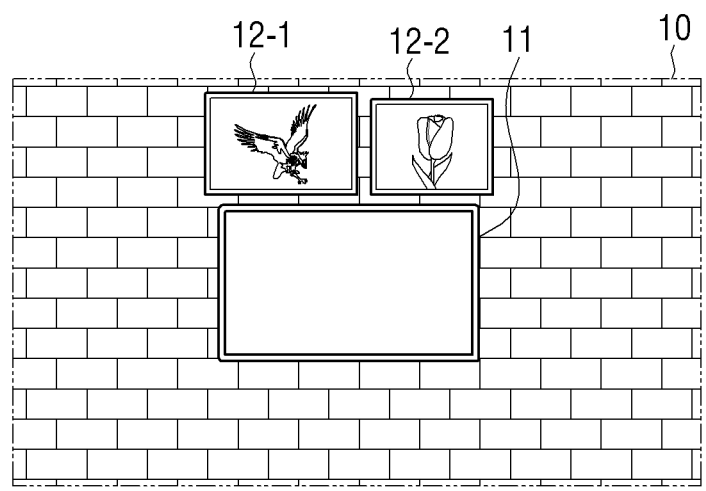
FIG. 6 is a view provided to explain an environmental information according to one embodiment of the present disclosure.
Figure 6:
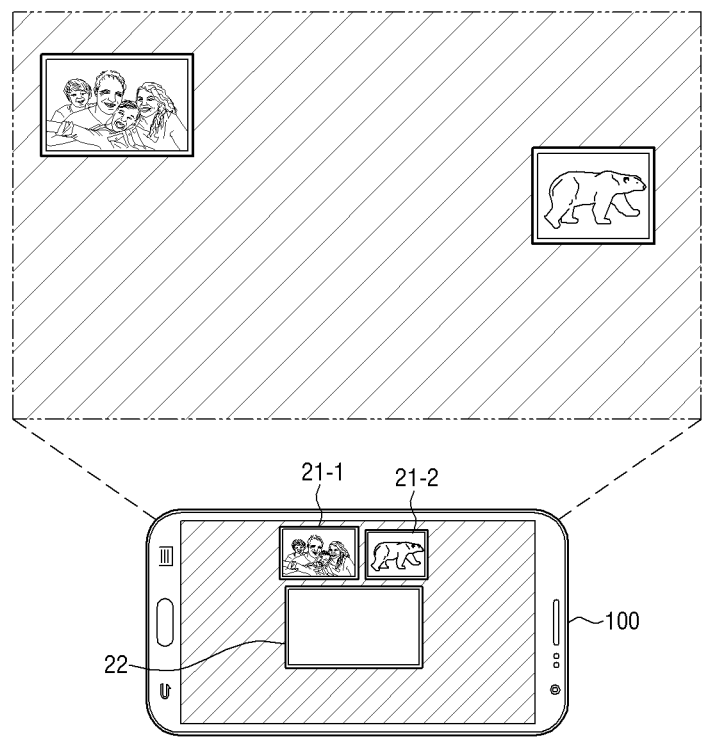

FIG. 6 is a view provided to explain an environmental information according to one embodiment of the present disclosure.

The display apparatus 100 according to an embodiment of the present disclosure may provide environmental information of the photographed image to the obtained image by rendering.

For example, the display apparatus uses the interior image received from the server as a background, and may obtain an image added with the TV image 22 selected by the user and the third object images 21-1 and 22-2 corresponding to the frame included in the indoor interior. The background of the obtained image may then be converted to the environmental information of the photographed image. For example, a case in which the background color information, the brightness information or the spatial size information of the interior image 10 is different from the background color information, the brightness information or the spatial size information of the photographed image may be assumed. The display apparatus 100 may substitute at least one from the background color information, the brightness information or the spatial size information of the interior image 10 with at least one from the background color information, the brightness information or the spatial size information of the photographed image.

Referring to FIG. 6, a case in which the interior image 10 uses the brick shaped wall paper as the background, and the indoor interior includes a hatch pattern wall paper may be assumed. The display apparatus 100 may provide an image in which the object image is removed or added on the basis of the background of the interior image as illustrated in FIG. 3B. According to another embodiment, an image in which the object image is removed or added on the basis of the background of the photographed image as illustrated in FIG. 6 may also be provided.

The display apparatus 100 according to an embodiment of the present disclosure may provide an image obtained by augmented reality (AR). For example, an object image corresponding to the object disposed in the indoor interior in the live view image received from the camera 120 is identified, and a plurality of images including the home appliance selected by the user may be obtained. The object image of a type identical to the home appliance selected by the user from the obtained plurality of interior images may then be removed. For example, the display apparatus 100 may remove an object image of a TV type selected by the user from each of the plurality of interior images. The display apparatus 100 may then identify an interior image having similarity equal to or greater than the threshold value with a photographed live view image from the plurality of interior images. An object image (for example, TV image) corresponding to the home appliance selected by the user is added to the identified interior image, and the remaining object image may be substituted with an object image identified in the live view image in which the indoor environment is photographed. The display apparatus 100 may generate and provide a virtual image in which the position of the object (for example, home appliances, furniture, home decoration product, or the like) disposed in the indoor interior is changed, and the selected home appliance or furniture (for example, TV or table) is disposed.

Referring to FIG. 6, the display apparatus 100 may identify the interior image 10 having similarity equal to or greater than the threshold value on the basis of the object images 21-1, 21-2 and 21-3 included in the image in which the indoor environment is photographed from the plurality of interior images. As illustrated in FIG. 6, the identified interior image 10 may include object images 12-1, 12-2 and 12-3 of an identical type. The display apparatus 100 preferentially determines the number and type of object images and may identify one from the plurality of interior images. For example, an interior image including two frames and one table from the plurality of interior images may be preferentially identified. An interior image may then be identified on the basis of the size of the two respective frames and the size of the table. However, this is merely exemplary, and at least one interior image having similarity equal to or greater than the threshold value with the photographed image from the plurality of interior images using an application programming interface (API) of various types, image search algorithms, or the like may also be identified.

Figure 7:
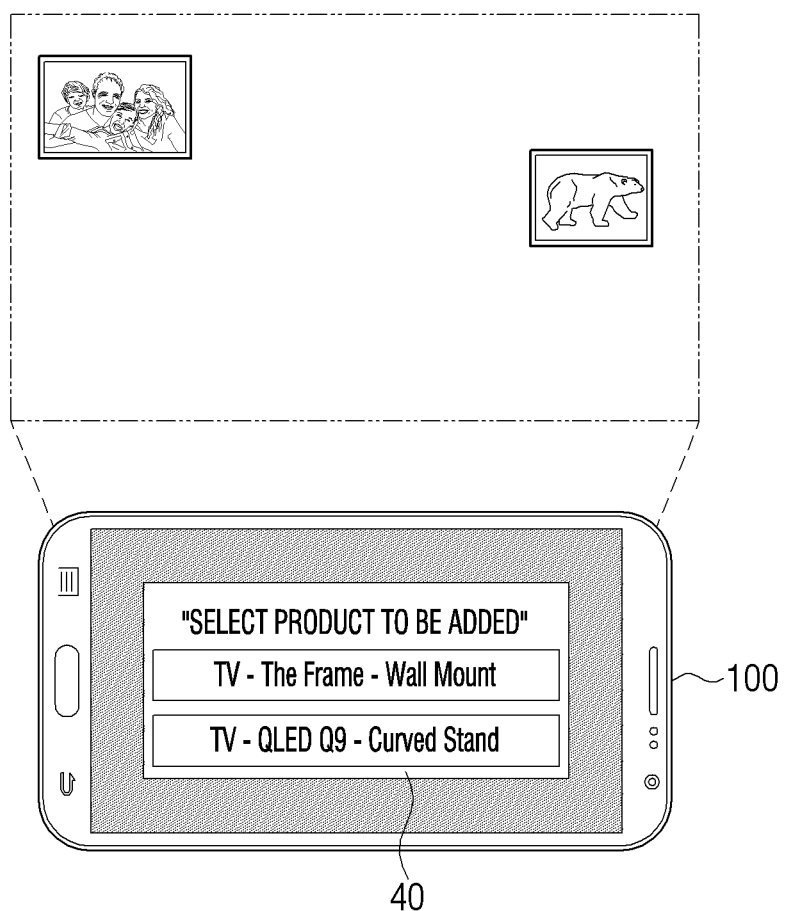
FIG. 7 is a view provided to explain a list according to one embodiment of the present disclosure.

FIG. 7 is a view provided to explain a list according to one embodiment of the present disclosure.

Referring to FIG. 7, the display apparatus 100 may display a list 40 including at least one identifying information of home appliances or furniture or at least one from an installation type. For example, the display apparatus 100 may display a list 40 including the identifying information of a home appliance or the installation type of a home appliance. Here, the identifying information of the home appliance may include the type, product specification, name of the product, feature, name of the manufacturer, size, or the like with respect to the home appliance. The installation type of the home appliance may refer to the installation method of the home appliance. For example, a TV may be classified as a stand type or a wall mountable type, and an air conditioner may be classified as a stand type, a wall mountable type, a system type, or the like. The display apparatus

100 may display the list 40 including at least one from the identifying information of the home appliance or the installation type. Based on the select command of the user being input with respect to the list 40, the display apparatus 100 may then receive the plurality of interior images including the first object image corresponding to the home appliance according to the select command.

According to another embodiment, the identifying information of furniture may include the type, product specification, name of product, feature, name of the manufacturer, dimensions, color, size, whether or not there is storage space, or the like with respect to the furniture. The installation type of furniture may refer to the installation method of furniture. For example, information such as information on available space required in installing furniture or the like may be included. The display apparatus 100 may display the list 40 including at least one from the identifying information of furniture or the installation type. Based on the select command by the user with respect to the list 40 being input, the display apparatus 100 may then receive the plurality of interior images including the first object image corresponding to the furniture according to the select command.

The display apparatus 100 according to an embodiment of the present disclosure receives the list 40 from the server, and may display the received list 40. Further, based on a keyword being input by the user, the display apparatus 100 may generate and display the list 40 on the basis of search results on the relevant keyword. For example, based on TV being input by the user, the display apparatus 100 may generate and display a 55-inch TV by company A, a curved TV by company A, a wall mount TV by company A or the like as a list 40.

Figure 8:
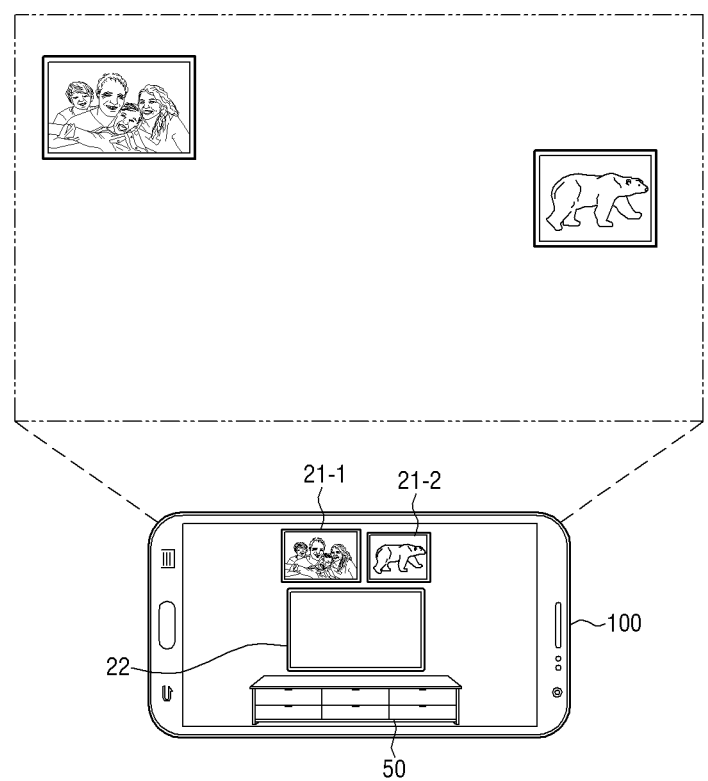
FIG. 8 is a view provided to explain a purchasing website link according to one embodiment of the present disclosure.

FIG. 8 is a view provided to explain a purchasing website link according to one embodiment of the present disclosure.

The display apparatus 100 according to an embodiment of the present disclosure, based on an object image that is not included in the photographed image from the obtained image being identified, may display the identified object image differently from the remaining object images.

According to an embodiment, the display apparatus 100 uses the first interior image as a background, adds the furniture or home appliance selected by the user, and may obtain an image added with furniture, home appliances, home decoration products, or the like included in the indoor interior. The display apparatus 100 may identify an object image not included in the photographed image but included in the first interior image used as a background. Referring to FIG. 8, a table image 50 may be included in the first interior image, but may be an object image not included in the photographed image. A case in which a table is not disposed in the indoor interior may be assumed.

The display apparatus 100 may identify the table image 50 from the obtained image, and may display the identified table image differently from the remaining object images. A website link for product purchasing corresponding to the identified object image from the identified object image may be provided. Based on the select command being input for the differently displayed object image, the display apparatus 100 may display product purchasing websites corresponding to the object image.

For example, a case in which an image obtained by the user being provided may be assumed. Like the table image 50 of FIG. 8, an object image included in the interior image but not disposed in an indoor environment may be provided through the obtained image. Based on the select command being input for the table image 50, the display apparatus 100 may provide a table purchasing website corresponding to the table image.

FIG. 9 is a flow chart provided to explain a control method of a display apparatus according to one embodiment of the present disclosure.

A control method of the display apparatus according to one embodiment of the present disclosure includes receiving information on a plurality of images including a first object image corresponding to an identical type with a selected object by the user and a second object image included in each of the plurality of images S910.

One from the plurality of images on the basis of information on a third object image identified from a photographed image and on the received second object image is then identified S920.

An obtained image on the basis of the identified image, a fourth object image corresponding to the object selected by the user, and the third object image is then displayed S930.

Here, the displaying the obtained image S930 refers to substituting the first object image in the identified image with the fourth object image corresponding to the object selected by the user, and obtaining an image by substituting the second object image included in the identified image with the third object image.

Here, information on the received second object image may include information on at least one from the number, the size or color of the second object image included in each of the plurality of images.

The identifying one from a plurality of images according on an embodiment of the present disclosure S920 identifies similarity between each of the plurality of images and the photographed image on the basis of at least one from the number, size or color of the third object image identified from the photographed image, and may identify the image with a similarity equal to or greater than the threshold value.

In addition, the identifying one from the plurality of images S920 may identify similarity on the basis of the environmental information of each of the plurality of images and the environmental information of photographed image. Here, the environmental image may include at least one from the background color information, the brightness information or the spatial size information.

In addition, based on the select command being input for at least one from the third object images identified from the photographed image, the identifying one from the plurality of images S920 includes identifying a similarity between each of the plurality of images and the photographed image by preferentially determining the similarity between the object image corresponding the select command from the third object images and the second object image included in each of the plurality of images.

The control method according to an embodiment of the present disclosure may include obtaining an image by adding a recommended object image of an identical type with the object selected by the user recommended on the basis of environmental information of an identified image from the plurality of images to the region in which the first object image is removed from the identified image.

In addition, the displaying the obtained image S930 may include displaying by processing the environmental information of the photographed image to the obtained image.

The control method according to an embodiment of the present disclosure may include displaying the list including at least one from the identifying information of the object or the installation type.

In addition, the receiving S910 includes receiving information on the plurality of images and the second object image included in each of the plurality of images from the server, which crawls and stores information on an object included in the indoor image and the interior image.

Based on an object image not included in the photographed image from the obtained image being identified, the displaying of an image according to an embodiment of the present disclosure S930 may include displaying the identified object image differently from the remaining objects and providing a website link for product purchasing corresponding to the object image identified in the identified object image.

Meanwhile, the methods according to the various embodiments of the present disclosure described above may be realized in an application form capable of being installed to existing electronic apparatuses.

In addition, the methods according to the various embodiments of the present disclosure described above may be realized as a software upgrade for existing electronic apparatuses or just as a hardware upgrade.

In addition, the various embodiments of the present disclosure described above may be performed through an embedded server included in the electronic apparatus or through an external server of at least one the electronic apparatus or the display apparatus.

Meanwhile, according to an embodiment of the present disclosure, the various embodiments described above may be realized as a software including a command stored in a machine-readable storage media readable by a machine (for example: computer). The machine summons a stored command from the machine-readable storage media, and an electronic apparatus (for example: electronic apparatus (A)) according to the disclosed embodiments, as an apparatus capable of operating according to the summoned command, may be included. Based on a command being executed by the processor, the processor uses other configurations directly or under the control of the processor to perform a function corresponding to the command. The command may include a code generated or executed by a compiler or an interpreter. The machine-readable storage media may be provided in the form of a non-transitory machine-readable media. Here, 'non-transitory' refers to the machine-readable storage media not including a signal and merely refers to being tangible, and does not differentiate data being stored semi-permanently or temporarily.

In addition, according to an embodiment of the present disclosure, the methods according to the various embodiments described above may be provided included in a computer program product. The computer program product may be traded between a seller and a purchaser. The computer program product may be distributed in the form of the machine-readable storage media (for example: in the form of a compact disc read only memory (CD-ROM)), or on-line through an application store (for example: Play Store™). In the case of on-line distribution, at least a portion of the computer program product may be temporarily stored or temporarily generated on a machine-readable storage media such as a memory of a relay server.

In addition, each of the elements (for example: module or program) according to the various embodiments described above may be configured to a singular entity or plural entities, and a portion of the sub-elements from the sub-elements described above may be omitted or other sub-elements may be further included in the various embodiments. In general or additionally, a portion of the elements (for example: module or program) may be integrated as one entity, and may perform identically or similarly the function performed by the each of respective elements prior to integration. The operations performed by the module or program according to the various embodiments or other elements may be performed consecutively, in parallel, repeatedly or heuristically, or at least a portion of the operations be executed in different order, omitted, or a different operation added.

While the disclosure has been shown and described with reference to the exemplary embodiments thereof, the present disclosure is not limited to the embodiments specifically described and various modifications may be made therein by those skilled in the art to which this disclosure pertains without departing from the spirit and scope of the disclosure, and such modifications shall not be understood as separate from the technical concept or outlook of the present disclosure.

What is claimed is:

1. A display apparatus comprising:
a communication interface;
a camera;
a display;
a user input interface; and
a processor configured to:
receive a user input for selecting a type of product through the user input interface;
receive, through the communication interface, information on a plurality of images, each of the plurality of images including a first object corresponding to the selected type of product, and a second object, wherein the received information includes information for identifying the second objects,
obtain an image photographed through the camera,
identify a third object included in the photographed image;
identify one image from the plurality of images based on information on the identified third object and the received information for identifying the second objects, and
control the display to display an obtained image based on the identified image, wherein the first object in the identified image has been replaced by a fourth object representing the selected type of product, and wherein the second object in the identified image has been replaced by the third object included in the photographed image.

2. The display apparatus as claimed in claim 1, wherein the received information for identifying the second object includes at least one item of information on the number, size or color of the second object included in each of the plurality of images, and
wherein the processor identifies similarity between each of the plurality of images and the photographed image based on at least one from number, size and color of the third object identified in the photographed image, and identifies one of the plurality of images having the similarity of a threshold value or higher.

3. The display apparatus as claimed in claim 2, wherein the processor identifies the similarity based on an environmental information of each of the plurality of images and the environmental information of the photographed image, and
wherein the environmental information includes at least one item of information from the background color information, brightness information or the spatial size information.

4. The display apparatus as claimed in claim 2, wherein the processor, based on a select command regarding at least one third object identified from the photographed image being input, preferentially determines similarity between an object corresponding to the select command from the third object and the second object included in each of the plurality of images to identify the similarity between each of the plurality of images and the photographed image.

5. The display apparatus as claimed in claim 1, wherein the processor controls the display to display obtained images by adding a recommended object image of an identical type with the selected type of product, recommended based on environmental information of the identified image from the plurality of images to a region from which the first object is removed from the identified image.

6. The display apparatus as claimed in claim 1, wherein the processor processes environmental information of the photographed image to display the obtained image through the display, and
  wherein the environmental information of the photographed image includes at least one of background color information, brightness information or spatial size information of the photographed image.

7. The display apparatus as claimed in claim 1, wherein the processor controls the display to display a list including at least one of identifying information of the type of product to be selected or an installation type.

8. The display apparatus as claimed in claim 1, wherein the processor receives the information on the plurality of images from a server.

9. The display apparatus as claimed in claim 1, wherein the processor, based on an object which is not included in the photographed image from the obtained image being identified, displays the identified object in a manner to be differentiated from remaining objects, and provides relevant website information corresponding to the identified object to the identified object.

10. A control method of a display apparatus including a processor, comprising:
  receiving a user input for selecting a type of product;
  receiving information on a plurality of images, each of the plurality of images including a first object corresponding to the selected type of product, and a second object, wherein the received information includes information for identifying the second objects;
  obtaining a photographed image;
  identifying a third object included in the photographed image;
  identifying one image from the plurality of images based on information on the identified third object and the received information for identifying the second objects; and
  displaying an obtained image based on the identified one of the plurality of images, wherein the first object in the identified image has been replaced by a fourth object representing the selected type of product and wherein the second object in the identified image has been replaced by the third object included in the photographed image.

11. The control method as claimed in claim 10, wherein the received information for identifying the second objects includes at least one item of information from the number, size or color of the second object included in each of the plurality of images, and
  wherein the identifying one from the plurality of images includes identifying similarity between each of the plurality of images and the photographed image based on at least one from number, size or color of the third object identified from the photographed image, and identifying one of the plurality of images having the similarity of a threshold value or higher.

12. The control method as claimed in claim 11,
  wherein the identifying one from the plurality of images includes identifying the similarity based on environmental information of each of the plurality of images and the environmental information of the photographed image, and
  wherein the environmental information includes at least one item of information from the background color information, brightness information or spatial size information.

13. The control method as claimed in claim 11,
  wherein the identifying one from the plurality of images includes preferentially determining similarity between the object corresponding to the select command from the third object and the second object included in each of the plurality of images based on a select command for one of the third object selected from the photographed image being input, and identifying similarity between each of the plurality of images and the photographed image.

14. The control method as claimed in claim 10, the method comprising obtaining an image by adding a recommended object of an identical type with the selected type of product recommended based on environmental information of the identified image from the plurality of images to a region from which the first object is removed from the identified image.

15. The control method as claimed in claim 10, wherein the displaying the obtained image includes processing and displaying environmental information of the photographed image, and
  wherein environmental information of the photographed image includes at least one from the background color information, brightness information or spatial size information of the photographed image.

16. The control method as claimed in claim 10, the method comprising displaying a list including at least one from identifying information of the type of product to be selected or installation type.

17. The control method as claimed in claim 10, wherein the receiving the information includes receiving the information on the plurality of images from a server.

18. The control method as claimed in claim 10,
  wherein the displaying the obtained image comprises displaying the identified object in a manner to be differentiated from the remaining objects once an object which is not included in the photographed image from the obtained image is identified, and providing relevant website information corresponding to the identified object to the identified object.

* * * * *